United States Patent [19]

Stein

[11] Patent Number: 5,569,689
[45] Date of Patent: Oct. 29, 1996

[54] ADDITION-CURABLE SILICONE ADHESIVE COMPOSITIONS

[75] Inventor: Judith Stein, Schenectady, N.Y.

[73] Assignee: General Electric Company, Schenectady, N.Y.

[21] Appl. No.: 538,150

[22] Filed: Oct. 2, 1995

[51] Int. Cl.$^6$ .............................. C08G 77/20; C08K 5/54
[52] U.S. Cl. .................. 524/188; 524/262; 524/714; 524/730; 524/588; 525/478; 528/15; 528/31; 528/32; 528/38; 556/418
[58] Field of Search ............................... 556/418; 528/15, 528/31, 32, 38; 524/188, 262, 714, 730, 588; 525/478

[56] References Cited

U.S. PATENT DOCUMENTS

| | | | |
|---|---|---|---|
| 4,281,145 | 7/1981 | Mitchell | 556/440 |
| 4,472,590 | 9/1984 | Mitchell | 556/418 |
| 4,788,310 | 11/1988 | Stein et al. | 556/419 |
| 5,173,529 | 12/1992 | Fujiki et al. | 524/188 |
| 5,342,870 | 8/1994 | Stein et al. | 524/188 |
| 5,399,738 | 3/1995 | Wolter et al. | 556/420 |
| 5,416,144 | 5/1995 | Stein et al. | 524/188 |
| 5,475,044 | 12/1995 | Stein et al. | 528/31 |

FOREIGN PATENT DOCUMENTS 6107672   4/1994   Japan .

*Primary Examiner*—Margaret W. Glass
*Attorney, Agent, or Firm*—William H. Pittman

[57] ABSTRACT

Addition-curable platinum group metal catalyzed silicone compositions are provided which utilize an adhesion promoter in the form of a Michael reaction product of a bis(aminoalkyl)tetraalkyldisiloxane, such as bis(aminopropyl)tetramethyldisiloxane, with an acryloxyorganotrialkoxysilane, for example, acryloxypropyltrimethoxysilane. The addition-curable silicone compositions can bond to plastic and metal substrates at temperatures of less than 100° C. and in less than 1 hour, forming composites which fail cohesively upon separation.

11 Claims, No Drawings

ADDITION-CURABLE SILICONE ADHESIVE COMPOSITIONS

BACKGROUND OF THE INVENTION

The present invention relates to adhesion promoters for addition-curable silicone compositions.

As shown in U.S. Pat. No. 3,284,406, the adhesion of a cured platinum catalyzed addition-curable silicone composition onto a substrate is improved by effecting the cure of the silicone composition at a temperature such as 100° C. for at least one hour.

U.S. Pat. No. 5,164,461, which is incorporated herein by reference, is directed to the use of certain silylalkyl maleates, silylalkylmaleimides and silylalkyl fumarates, such as bis[3(trimethoxysilyl)alkyl]fumarates, as adhesion promoters in addition-curable silicone adhesive compositions. Although these silicone compositions are self-bonding to various substrates, such as plastics, metals and glass, they also require a temperature of about 100°–150° C. to effect a satisfactory cure.

It would be desirable, therefore, to provide an addition-curable silicone adhesive composition which could be applied onto an unprimed substrate, such as plastic or metal, to effect a satisfactory cure in less than an hour and at a temperature of less than 100° C. In addition, it also would be desirable to produce a silicone substrate composite having a silicone layer which would fail cohesively instead of adhesively when tested. As used hereinafter, the expression "adhesive failure" means the silicone layer can be cleanly separated from the substrate, while in a "cohesive failure", rupture can occur in the silicone layer or in the substrate when separation is attempted.

SUMMARY OF THE INVENTION

The present invention is based on the discovery that reaction products of a bis(aminoalkyl)polyalkylsiloxane, such as bis(aminopropyl)tetramethyldisiloxane, and an acryloxyalkyltrialkoxysilane, for example, acryloxypropyltrimethoxysilane, can be used as adhesion promoters for addition-curable silicone compositions. Surprisingly, such silicone compositions can be used to make composites with thermoplastic or metal substrates at temperatures below 100° C., such as 85° C. In addition, the composites exhibit cohesive failure when tested for lap shear strength.

In one aspect of the invention, there are provided platinum group metal catalyzed addition-curable silicone compositions comprising by weight:

(A) 100 pads of at least one polyorganosiloxane having alkenyl groups bonded to silicon, (B) about 1–20 parts of at least one hydride polysiloxane comprising at least one organosiloxane unit having an Si-H moiety, (C) a catalytic amount of a platinum group metal hydrosilylation catalyst, and (D) an adhesion-promoting proportion of at least one silicon-nitrogen compound of the formula

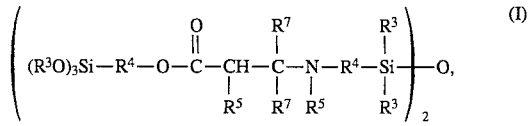

wherein $R^3$ is $C_{1-4}$ alkyl, $R^4$ is $C_{2-8}$ alkylene, $R^5$ is hydrogen or $C_{1-4}$ alkyl and $R^7$ is hydrogen or $C_{1-4}$ alkyl.

A further aspect of the invention is silicon-nitrogen compounds of formula I.

DETAILED DESCRIPTION; PREFERRED EMBODIMENTS

Some of the adhesion promoters of formula I are:

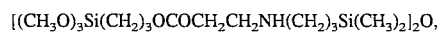

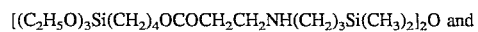

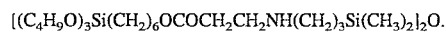

The adhesion promoter can be synthesized by the Michael reaction of a bis(aminoalkyl)tetraalkyldisiloxane with a (meth)acryloxyorganotrialkoxysilane at room temperature or at a temperature up to about 100° C., depending upon the reactants. An effective amount of a stable free radical spin trap such as 4-hydroxy-2,2,6,6-tetramethyl-1-piperidinyloxy can be used to inhibit premature polymerization of the (meth)acryloxy compound.

The addition-curable compositions of the invention can be used as adhesives in industrial multilayer laminates. Substrates which may be present in such laminates are glass, metals, metal oxides, and plastics. Examples of metal substrates include copper, aluminum, galvanized steel, cold-rolled steel and cast magnesium. Among the plastics, there are included polyetherimides, phenolic resins, epoxy resins, polyamides, unsaturated polyesters, poly(ethylene terephthalate), polycarbonates, polyphenylene sulfide, polyacetals and polyimides. An effective amount of the adhesion promoter is typically about 0.3–1.5 parts by weight per 100 parts by weight of addition-curable composition.

Reagent A in the addition-curable compositions of this invention is at least one polyorganosiloxane having alkenyl groups bonded to silicon. ! t typically comprises a vinyl-terminated polydiorganosiloxane of the formula

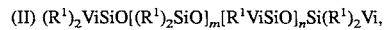

wherein Vi is a vinyl radical; $R^1$ is $C_{1-8}$ alkyl, phenyl or $C_{3-10}$ fluoroalkyl; and m+n has a value sufficient to provide a viscosity in the range of about 100–100,000 centipoise at 25° C. Said vinyl-terminated polydiorganosiloxane generally has a vinyl content of about 0.02–2.0% by weight. It preferably has a viscosity in the range of about 3,000–95,000 centipoise at 25° C., with preferred embodiments employing vinyl-terminated polydiorganosiloxanes with viscosities in the ranges of 65,00–95,000 and 3,000–5,000 centipoise, respectively. The $R^1$ radicals are preferably alkyl radicals of 1–4 carbon atoms and most preferably methyl.

In a preferred embodiment of the invention, reagent A is the combination of:

(1) a blend containing about 25-35 parts by weight of a vinyl-terminated polydiorganosiloxane of formula II having a viscosity in the range of about 3,000–5,000 centipoise at 25° C. and about 65–75 parts of a vinyl-terminated polydiorganosiloxane of formula I! having a viscosity in the range of about 75,000–95,000 centipoise at 25° C.;

(2) about 5.5–7.5 parts per 100 parts of (1) of a low viscosity polydiorganosiloxane composition having an average of at least one vinyldiorganosiloxy end group, a vinyl content of about 0.2– 0.3% by weight and a viscosity in the range of about 400–700 centipoise at 25° C., (3) about 5.5–7.5 parts per 100 parts of (1) of a vinyldiorganosiloxy-terminated diorganopolysiloxane having a vinyl content in the range of about 1.4–2.0% by weight and a viscosity in the range of about 300–600 centipoise at 25° C.

Reagent A may also contain up to 100 parts, per 100 parts of said vinyl-terminated polydiorganosiloxane, of a solid benzene-soluble siloxane resin containing $(R^2)_3SiO-$ units (M units) and $Si(O-)_4$ units (Q units), wherein each $R^2$ is independently vinyl or a monovalent hydrocarbon radical free from aliphatic unsaturation and containing up to 6 carbon atoms, the ratio of M units to Q units being about 0.5–1.5:1. Said benzene-soluble resin generally has a vinyl content of about 1.5–3.5% by weight. It may further contain $R^2Si(O-)_3$ units (T units) and/or $-Si(R^2)_2O-$ units (D units), each of the D and T units being present in amounts up to about 10 mole percent.

Reagent B, the hydride polysiloxane, functions as a crosslinking agent. It usually comprises structural units of the formula $$(R^8)_aH_bSiO_{(4-a-b)/2},\qquad (III)$$

wherein $R^8$ is a $C_{1-10}$ monovalent hydrocarbon or halogenated hydrocarbon radical free from aliphatic unsaturation, a+b is 0–3. Preferably, reagent B has a viscosity in the range of about 10–1,000 and most preferably about 10–150 centipoise at 25° C. and a hydrogen content of about 0.02–1.6% by weight. $R^8$ is preferably $C_{1-8}$ alkyl, phenyl or $C_{3-10}$ fluoroalkyl, the preferred fluoroalkyl radical being trifluoropropyl. Most preferably, $R^8$ is methyl.

Other hydrogen-containing polysiloxane fluids which can be used as reagent B include fluid siloxane copolymer resins comprised of M, Q, D, $M^H$ and $D^H$ units ($M^H$ and $D^H$ designating M and D units containing a hydrogen atom) and mixtures of fluid polyorganosiloxanes and fluid siloxane copolymer resins as described in U.S. Pat. No. 3,627,851, which is hereby incorporated by reference herein. The preferred resins are $M^{HQ}$ resins wherein the ratio of $M^H$ units to Q units is in the range of 0.4–2.0:1. Polysiloxanes having at least one $R^2$ group bonded to silicon bearing at least one reactive hydrogen atom are preferred. The hydrogen-containing polysiloxane can be a single compound or a mixture of compounds. Additional hydrogen-containing polysiloxanes suitable for use in the present invention are disclosed, for example, in U.S. Pat. No. 4,061,609, which is incorporated by reference herein.

Still further examples of hydrogen-containing polysiloxanes which can be used in the present invention are linear triorganosiloxy-terminated fluids having a viscosity in the range of about 15–40 centistokes at 25° C. and a hydrogen content of 0.5–1.6% and preferably 0.1–1.0% by weight. In instances where reagent A has a viscosity of 3,000–5,000 centipoise and reagent B is a triorganosiloxy-terminated organohydrogensiloxane, the Si—H:Si-vinyl ratio is preferably at least 2.1:1, with about 2.1–10:1 being preferred and about 2.1–3.5:1 is preferred.

Reagent C is a platinum group metal catalyst. Suitable catalysts may be complexes of ruthenium, rhodium, palladium, osmium, iridium or platinum. Examples of suitable hydrosilylation catalysts are disclosed, in U.S. Pat. Nos. 3,159,601, 3,159,662, 3,220,970, 3,775,452, 3,516,946 and 4,029,629, all incorporated by reference herein.

Preferably, reagent C is a platinum-containing catalyst. A reaction product of chloroplatinic acid with tetramethyldivinyldisiloxane in the presence of sodium bicarbonate as disclosed in the aforementioned U.S. Pat. No. 3,775,452 dissolved in xylene to a level of about 5% by weight platinum, is often especially preferred; it is hereinafter designated "Karstedt's catalyst". Another preferred platinum-containing catalyst is a platinum-octanol complex containing 90.9% octanol and 9.1% chloroplatinic acid by weight.

The catalyst is used in a catalytic amount, which is that amount sufficient to promote the hydrosilylation reaction. Generally, a suitable amount is at least 0.1 ppm and preferably 5–250 ppm based on total hydrosilylation mixture. Inhibitors such as acetylenic alcohols, amines, and cyanurates also can be present in an effective amount.

The addition-curable silicone compositions of the present invention preferably also contain extending and/or reinforcing fillers. They can contain up to about 200 and preferably about 10–100 parts by weight of extending fillers, and up to about 50 and preferably about 20–50 parts by weight of reinforcing fillers. In the absence of benzene-soluble siloxane resin as part of reagent A, it is strongly preferred that the composition contain an effective amount of reinforcing filler.

Examples of extending fillers are α-quartz, crushed quartz, aluminum oxide, aluminum silicate, zirconium silicate, magnesium oxide, zinc oxide, talc, diatomaceous earth, iron oxide, calcium carbonate, clay, titania, zirconia, mica, glass such as ground glass or glass fiber, sand, carbon black, graphite, barium sulfate, zinc sulfate, wood flour, cork and fluorocarbon polymer powder. The preferred extending filler is α-quartz.

Examples of reinforcing fillers are silica such as fumed silica and precipitated silica, and treated silica fillers such as fumed or precipitated silica that has been reacted with, e.g., an organohalosilane, a disiloxane or a disilazane. Fumed silica is particularly effective. A particularly preferred treated fumed silica is one which has been treated first with cyclic polysiloxanes, e.g., octamethylcyclotetrasiloxane, according to the methods known in the art, for example, as taught in U.S. Pat. No. 2,938,009 and then treated with a silazane, e.g., hexamethyldisilazane, for example, as taught in U.S. Pat. Nos. 3,635,743 or 3,847,848, all incorporated by reference herein, so as to remove most of the free silanols on the surface of the silica. Such a filler is sometimes referred to herein as "treated fumed silica".

The compositions of the present invention can be prepared by homogeneously mixing the above-described components and any other ingredients, using suitable mixing means, such as a spatula, a drum roller, a mechanical stirrer, a 3-roll mill, a sigma blade mixer, a bread dough mixer or a 2-roll mill. The order of mixing is not critical; however, it is preferred that reagents B and C be brought together in the presence of reagent D, most preferably in a final mixing step. Thus, it is possible to mix all components in one mixing step immediately prior to the intended use of the curable composition. Alternatively, certain components can be premixed to form two or more packages which can be stored, if desired, and then mixed in a final step immediately prior to the intended use thereof.

It is preferred to mix reagents C and D and a portion of reagent A, along with optional components such as fillers and solvents, to provide a first package. Separately, reagent B can be mixed with the remaining portion of reagent A to provide a second package. These two packages can then be stored until the composition of the invention is desired, and then homogeneously mixed.

The addition-curable silicone compositions of the invention will bond in the absence of primer to various plastic, metal, glass, and masonry substrates. It has often been preferred to condition certain substrates such as polyetherimide by treatment with a 5M KOH solution at 70° C. for 5 minutes followed by a rinse; however, one advantage of the present invention is that such conditioning operations are unnecessary. The thickness of the silicone composition on a substrate is typically about 20–60 mils.

The addition-curable compositions of the invention can be applied to the surface of the substrate by any suitable means such as rolling, spreading or spraying, and cured at a temperature in the range of about 50°–100° C. over a period of about 10–30 minutes.

The invention is illustrated by an example in which a mixture of 2.48 g (0.01 mol) of bis(aminopropyl)tetramethyldisiloxane, 4.48 g (0.02 mol) of acryloxypropyltrimethoxysilane and 0.01g of 4-hydroxy-2,2,6,6-tetramethyl-1-piperidinyloxy was heated to 70° C. with stirring for two hours. Complete addition of the acrylate to the amine disiloxane was confirmed by 1H NMR spectroscopy. Based on method of preparation and 1H NMR spectroscopy, there was obtained the following compound, which is referred to hereinafter as the "promoter": $[(CH_3O)_3Si(CH_2)_3OCOCH_2CH_2NH(CH_2)_3Si(CH_3)_2]_2O$.

An addition-curable silicone adhesive composition was prepared by blending 0.05 g of the promoter with 10 g of a mixture of a vinyl-terminated polydimethylsiloxane having a viscosity of 60,000–95,000 centipoise and a vinyl-containing benzene-soluble methylsiloxane resin containing M and Q units in a ratio of about 0.5–1.5:1, said mixture having a vinyl content of about 1.5–3.5% by weight. The resin mixture also contained 13 ppm of a platinum catalyst as described in U.S. Pat. No. 3,775,452. There were then added 0.002 g of 2-methyl-3-butyn-2-ol, 0.50 g of a hydrogen-containing methylpolysiloxane fluid (equivalent weight 102) and an additional 10 ppm of platinum.

The composition was degassed using two cycles of evacuation/centrifugation. Lap shear specimens with an 0.5-inch overlap were prepared on isopropyl alcohol-wiped Alclad steel, on LEXAN polycarbonate ("PC") and on ULTEM polyetherimide("PEI"), the latter two manufactured by GE Plastics.

The specimens were cured at 85° C. for 1 hour. The lap shears were then tested on an Instron 4202 using a crosshead speed of 0.5 inch/minute. The same procedure was repeated, except that a control silicone adhesive formulation was used which did not contain the adhesion promoter. The following results were obtained, where the failure mode shows the type of separation of the cured silicone adhesive formulation from the substrate.

| Promoter | Substrate | Failure mode | Strength, psi |
|---|---|---|---|
| yes | Alclad | cohesive | 224 |
| yes | steel | cohesive | 170 |
| yes | PEI | cohesive | n.a. |
| yes | PC | cohesive | 233 |
| no | all | adhesive | — |

The above results show that the adhesion promoter of the present invention is useful in effecting a substantial improvement in the cure requirements of the addition-curable silicone composition. In addition, the adhesion promoter is capable of providing thermoplastic or metallic composites exhibiting cohesive failure modes combined with satisfactory lap shear strength.

What is claimed is:

1. An addition-curable silicone composition comprising by weight:

(A) at least one polyorganosiloxane having alkenyl groups bonded to silicon, (B) about 1–20 parts by weight, per 100 parts of reagent A, of at least one hydride polysiloxane comprising at least one organosiloxane unit having an Si—H moiety, (C) a catalytic amount of a platinum group metal hydrosilylation catalyst, and (D) an adhesion-promoting proportion of at least one silicon-nitrogen compound of the formula

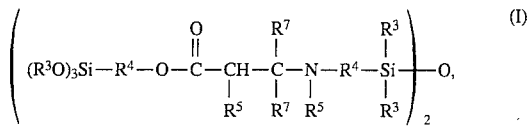

wherein $R^3$ is $C_{1-4}$ alkyl, $R^4$ is $C_{12-8}$ alkylene, $R^5$ is hydrogen or $C_{1-4}$ alkyl and $R^7$ is hydrogen or $C_{1-4}$ alkyl.

2. A composition according to claim 1 wherein reagent A comprises a vinyl-terminated polydiorganosiloxane of the formula

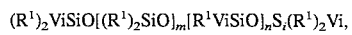

wherein Vi is a vinyl radical; $R^1$ is $C_{1-8}$ alkyl, phenyl or $C_{3-10}$ fluoroalkyl; and m+n has a value sufficient to provide a viscosity in the range of about 100–100,000 centipoise at 25° C.

3. A composition according to claim 2 wherein reagent A further comprises a solid benzene-soluble siloxane resin containing M units of the formula $(R^2)_3SiO$— and Q units of the formula $Si(O—)_4$, wherein each $R^2$ is independently vinyl or a monovalent hydrocarbon radical free from aliphatic unsaturation and containing up to 6 carbon atoms, the ratio of M units to Q units being about 0.5–1.5:1.

4. A composition according to claim 3 wherein each $R^2$ is methyl.

5. A composition according to claim 2 wherein reagent B comprises structural units of the formula

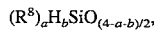

wherein $R^8$ is a $C_{1-10}$ monovalent hydrocarbon or halogenated hydrocarbon radical free from aliphatic unsaturation, each of a and b is 0–3 and a+b is 0–3.

6. A composition according to claim 5 wherein each $R^1$ and each $R^8$ is methyl.

7. A composition according to claim 1 wherein the platinum group metal is platinum.

8. A composition according to claim 1 further comprising at least one filler selected from the group consisting of extending and reinforcing fillers.

9. A composition according to claim 1 wherein reagent D has the formula

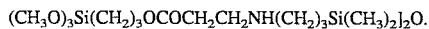

10. A silicon-nitrogen compound of the formula

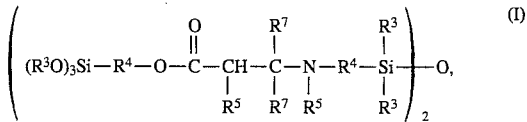

wherein $R^3$ is $C_{1-4}$ alkyl, $R^4$ is $C_{2-8}$ alkylene, $R^5$ is hydrogen or $C_{1-4}$ alkyl and $R^7$ is hydrogen or $C_{1-4}$ alkyl.

11. A compound according to claim 10 having the formula

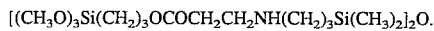

* * * * *